(12) United States Patent
Gensler et al.

(10) Patent No.: US 9,844,744 B2
(45) Date of Patent: Dec. 19, 2017

(54) FILTER ELEMENT

(71) Applicants: MAHLE INTERNATIONAL GMBH, Stuttgart (DE); BAYERISCHE MOTOREN WERKE AKTIENGESELLSCHAFT, München (DE)

(72) Inventors: Harry Gensler, Leonberg (DE); Stefan Kaiser, Waiblingen (DE); Samuel Kohler, Weil im Schoenbuch (DE); Hans Waibel, Remseck/Aldingen (DE); Dirk Depiereux, Ottobrunn (DE)

(73) Assignees: MAHLE INTERNATIONAL GMBH (DE); BAYERISCHE MOTOREN WERKE AG (DE)

( * ) Notice: Subject to any disclaimer, the term of this patent is extended or adjusted under 35 U.S.C. 154(b) by 108 days.

(21) Appl. No.: 14/888,705

(22) PCT Filed: Apr. 30, 2014

(86) PCT No.: PCT/EP2014/058785
§ 371 (c)(1),
(2) Date: Nov. 2, 2015

(87) PCT Pub. No.: WO2014/177598
PCT Pub. Date: Nov. 6, 2014

(65) Prior Publication Data
US 2016/0082379 A1    Mar. 24, 2016

(30) Foreign Application Priority Data

May 3, 2013   (DE) .................. 10 2013 208 162

(51) Int. Cl.
*B01D 46/00* (2006.01)
*B01D 46/24* (2006.01)
(Continued)

(52) U.S. Cl.
CPC ....... *B01D 46/0002* (2013.01); *B01D 46/002* (2013.01); *B01D 46/12* (2013.01);
(Continued)

(58) Field of Classification Search
CPC ........ B01D 46/00; B01D 46/24; B01D 46/52; F02M 35/024
(Continued)

(56) References Cited

U.S. PATENT DOCUMENTS 5,901,681 A * 5/1999 Mueller ............. F02M 35/0203
                                                              123/198 E
5,968,215 A * 10/1999 Webb ................. B01D 46/0002
                                                              55/385.3
(Continued)

FOREIGN PATENT DOCUMENTS

DE    202008010474 U1    12/2009
DE    102011008325 A1    7/2012
(Continued)

OTHER PUBLICATIONS

English abstract for DE-102011083657.

*Primary Examiner* — Duane Smith
*Assistant Examiner* — Minh-Chau Pham
(74) *Attorney, Agent, or Firm* — Fishman Stewart PLLC

(57) ABSTRACT

A filter element having a longitudinal center axis for a fresh air system of an internal combustion engine may include a first plate filter body composed of a pleated filter material and a separate second plate filter body composed of a pleated filter material. The filter element may include first wall body and a second wall body, and a first end body and a second end body. The first wall body, the second wall body, the first end body and the second end body may be connected to the first plate body and the second plate filter body to define an inner space. At least one of the first plate filter body and the (Continued)

second plate filter body may include a curvature projecting to the interior space in a profile extending transversely to a longitudinal direction with respect to the longitudinal center axis.

20 Claims, 4 Drawing Sheets

(51) Int. Cl.
*B01D 46/52* (2006.01)
*F02M 35/024* (2006.01)
*B01D 46/12* (2006.01)
*F02M 35/02* (2006.01)

(52) U.S. Cl.
CPC ...... *B01D 46/2403* (2013.01); *B01D 46/2411* (2013.01); *B01D 46/521* (2013.01); *F02M 35/0205* (2013.01); *F02M 35/0245* (2013.01); *F02M 35/02491* (2013.01); *B01D 2265/04* (2013.01)

(58) Field of Classification Search
USPC ....... 55/385.3, 498, 502, 510, DIG. 28, 521, 55/DIG. 5, 529; 123/198 E
See application file for complete search history.

(56) References Cited

U.S. PATENT DOCUMENTS

| | | | | |
|---|---|---|---|---|
| 6,383,268 | B2* | 5/2002 | Oda | B01D 46/0005 55/385.3 |
| 6,755,881 | B2* | 6/2004 | Ruehle | B01D 46/0002 123/198 E |
| 7,655,074 | B2* | 2/2010 | Nepsund | B01D 46/0004 55/385.3 |
| 2012/0047856 | A1* | 3/2012 | Khami | B01D 46/0002 55/385.3 |
| 2012/0159910 | A1 | 6/2012 | Mills et al. | |
| 2012/0174788 | A1 | 7/2012 | Felber et al. | |
| 2015/0013542 | A1* | 1/2015 | Hasenfratz | B01D 46/522 96/134 |
| 2015/0337778 | A1* | 11/2015 | Wagner | B01D 46/0047 55/385.3 |

FOREIGN PATENT DOCUMENTS

| | | |
|---|---|---|
| DE | 102011083657 A1 | 3/2013 |
| WO | WO-2004/052504 A2 | 6/2004 |

\* cited by examiner

FILTER ELEMENT

CROSS-REFERENCE TO RELATED APPLICATIONS

This application claims priority to German Patent Application No. 10 2013 208 162.6, filed May 3, 2013, and International Patent Application No. PCT/EP2014/058785, filed Apr. 30, 2014, both of which are hereby incorporated by reference in their entirety.

TECHNICAL FIELD

The present invention relates to a filter element, preferably an air filter element for a fresh air system of an internal combustion engine.

BACKGROUND

Filter elements exist in a variety of forms and configurations. Air filter elements of fresh air systems in vehicle applications are frequently subject to the installation situations which are to be found there. Frequently, there is a shortage of installation space in an engine compartment of a vehicle, so that available installation spaces have to be utilized as efficiently as possible, in order to be able to achieve sufficiently large filter elements or respectively a sufficient filter performance with tolerable through-flow resistance. Usually, filter elements are constructed symmetrically, whereby they are little suitable for asymmetrical installation space situations.

SUMMARY

The present invention is concerned with the problem of indicating for such a filter element an improved or at least different embodiment, which is distinguished in that it is suitable in a particular manner for asymmetrical installation spaces.

This problem is solved according to the invention by the subject of the independent claim(s). Advantageous embodiments are the subject of the dependent claims.

The invention is based on the general idea of configuring the filter element as a hollow body, in which two through-flowable plate filter bodies and two non through-flowable wall bodies alternate in a circumferential direction, such that the two plate filter bodies lie diametrically opposite one another and that the two wall bodies likewise lie diametrically opposite one another. The longitudinal ends of the plate filter bodies and of the wall bodies are then provided with end bodies, which form the axial face sides of the filter element. Through the use of two separate plate filter bodies, these can be configured differently geometrically, whereby the geometry of the filter element can be varied in a simple manner, for example in order to achieve an asymmetrical structural shape for the filter element. The use of two separate wall bodies is of crucial importance here, because with these separate wall bodies, geometrical differences between the two plate filter bodies can be compensated. Also, the two end bodies are important for the filter element, which is configured as a hollow body, because by means of the end bodies a stable fixing in position of the two wall bodies relative to one another is made possible, whereby the wall bodies can form with the end bodies a sufficiently stable supporting frame for the two plate filter bodies. The filter element which is presented here can therefore be assembled from comparatively few individual parts, wherein the possibility exists for realizing different asymmetrical geometries for the filter element by varying the plate filter bodies, the wall bodies and the end bodies. Accordingly, the filter element can come into use in different and, in particular in critical, installation situations.

In detail, the filter element presented here comprises a first plate filter body made of a pleated filter material and a separate second plate filter body made of a pleated filter material, lying opposite the first plate filter body. The filter element further comprises a first wall body made of plastic, which is rigidly and tightly connected to a first transverse end of the first plate filter body and to a first transverse end of the second plate filter body, and a second wall body made from plastic, lying opposite the first wall body, which second wall body is rigidly and tightly connected to a second transverse end of the first plate filter body and to a second transverse end of the second plate filter body. Finally, there are provided a first end body made from plastic, which is rigidly and tightly connected to a first longitudinal end of the first plate filter body and to a first longitudinal end of the second plate filter body, and a second end body made from plastic, lying opposite the first end body, which second end body is tightly connected to a second longitudinal end of the first plate filter body and to a second longitudinal end of the second plate filter body. In order to obtain an operational filter element, at least one gas passage opening must be present, which serves as an inlet opening or as an outlet opening. Expediently, such a gas passage opening is constructed at least on one of the end bodies.

According to an advantageous embodiment, the first transverse end of the first plate filter body can lie in a first plane, which is spaced apart from a second plane, in which the first transverse end of the second plate filter body lies. Hereby, an asymmetrical geometry for the filter element can be realized in a particularly simple manner.

Additionally or alternatively, provision can be made to dimension the two plate filter bodies so as to be of different size in their transverse direction. In particular, thereby a wedge shape can be realized in the cross-section of the filter element, which can be advantageous in the case of particular installation situations.

In another embodiment, provision can be made that the two plate filter bodies are of equal size in their longitudinal direction. In particular, the first longitudinal ends and the second longitudinal ends of the two plate filter bodies can lie respectively in a plane which extends transversely to the longitudinal direction of the plate filter bodies or respectively of the filter element. Accordingly, the end bodies also extend substantially parallel to one another. Altogether, the filter element can thereby have a rectangular cross-section in a projection oriented parallel to the transverse direction of the plate filter bodies. Hereby, the structure of the filter element is simplified. At the same time, the structure of an associated filter housing is also simplified thereby, into which the filter element can be inserted.

In another embodiment, at least one of the two wall bodies between the two plate filter bodies can have a curvature or a step in profile transversely to the longitudinal direction of the plate filter bodies. Through this measure, the filter element can be adapted in a particularly simple manner to a predetermined installation situation, in order to be able to utilize the available installation space as efficiently as possible. The curvature or step can be oriented outwards here, so that an interior space of the filter element increases in size compared with an embodiment with a non-curved or respectively non-stepped wall body. Alternatively, the curvature or the step can also be oriented inwards, so that the interior space of the filter element reduces in size compared with an embodiment with a non-curved or respectively non-stepped wall body.

According to an advantageous further development, the curvature or respectively the step in a central region of the respective wall body, which is arranged distally to both end bodies, can be more intensively pronounced than in end regions of the respective wall body, which are arranged on both sides of the central region proximally to an end body in each case. In particular, the end regions can be non-curved or respectively non-stepped here. Through this measure, an adaption of the filter element to different installation situations can be realized, without the remaining configuration with respect to the end bodies and to the plate filter bodies having to be altered here.

In another advantageous further development, the curvature or respectively the step can be oriented inwards and can be so pronounced that the central region projects into a projection of the gas passage opening oriented parallel to the longitudinal direction.

In another embodiment, the filter element of the two plate filter bodies can be folded in the transverse direction of the respective plate filter body, so that end folds of the respective plate filter body are situated at the longitudinal ends of the respective plate filter body and are connected there rigidly and tightly to the respective end body. Usually, the pleated filter material is cut in a straight line on the edge side, so that the first transverse end and the second transverse end of the respective plate filter body lie in planes parallel to one another. This simplifies the connection to the wall bodies. In particular, the plate filter bodies can be plasticized into the plastic of the wall bodies.

According to an advantageous embodiment, at least one of the wall bodies can be locked in place at at least one of its longitudinal ends with the respective end body. Preferably, both wall bodies are locked in place at the respective longitudinal end with the respective end body. An embodiment is particularly advantageous, in which both wall bodies are locked in place at their two longitudinal ends respectively with the respective end body. Through the use of a locking in place, the assembly of the filter element is simplified. In particular, it is conceivable that the respective end body is glued to the wall bodies and/or to the plate filter bodies, wherein the locking in place enables a preliminary fixing until the respective adhesive is hardened or respectively dried. The adhesive connection then produces the final fixing.

In another advantageous embodiment, the two wall bodies can have at their longitudinal ends respectively two engagement hooks, which engage over the respective end body on the edge side. Hereby, in the longitudinal direction, i.e. in the axial direction of the filter element, a form-fitting coupling can be realized between the wall bodies and the end bodies, which improves the pressure stability of the filter element. However, the engagement hooks also simplify at the same time the assembly of the filter element, because no additional separate fastening means are necessary. Alternatively, it is likewise possible to provide such engagement hooks on the respective end body, which then engage on a corresponding engagement contour, which is constructed on the respective wall body.

According to an advantageous embodiment, the respective end body can be connected rigidly and tightly to the facing longitudinal ends of the two plate filter bodies and to the two wall bodies. This can be realized in a particularly simple manner by means of a welded connection or by means of an adhesive connection. With regard to an embodiment in which the end bodies are glued to the plate filter bodies and to the wall bodies, the previously mentioned embodiment with the engagement hooks is particularly advantageous. For example, the end bodies with the adhesive already applied thereon can be mounted onto the wall bodies and the plate filter bodies. The engagement hooks undertake the fixing until the respective adhesive is hardened.

According to another advantageous embodiment, provision can be made that only the first end body has the one gas passage opening, whilst the second end body is closed. The gas passage opening then forms either an inlet opening or an outlet opening, according to the through-flow direction of the filter element. In an alternative embodiment, the second end body can have a secondary opening, which can be present in addition to the gas passage opening (primary opening), in order to discharge secondary air for other purposes.

In another further development, the second end body can have on one side, preferably on its outer side facing away from the first end body, a first fastening bracket, by means of which the filter element is able to be fixed in a filter housing. Hereby, the mounting of the filter element in the filter housing is simplified.

In another advantageous further development, the second end body can have a second fastening bracket on a side lying opposite the first fastening bracket, preferably on its inner side facing the first end body. In addition, provision can be made optionally that the second end body is configured so that it is able to be mounted optionally with the first fastening bracket outwards or with the second fastening bracket outwards at the respective longitudinal end of the wall bodies. The two fastening brackets are configured differently here, so that they come into use for different installation situations of the filter element. As two different variants for the filter element are able to be realized by means of the same end body, the manufacturing costs for this variant formation are reduced. It is clear that in such a reversible second end body, the terms "outer side" "inner side", "first fastening bracket" and "second fastening bracket" are to be understood in a relative manner, namely with reference to the respective installation position or respectively mounting position on the filter element.

Whilst the one wall body, preferably the first wall body, can have the said curvature or step, the second wall body is preferably non-curved or respectively non-stepped and is therefore configured substantially flat.

The wall bodies can be equipped on their outer side and/or on their inner side with a plurality of longitudinal ribs running parallel to the longitudinal direction and with a plurality of transverse ribs running parallel to the transverse direction, which intersect multilaterally, in so far as they are arranged on the same side of the respective wall body.

Further advantageous geometric adaptations of the filter element to available installation spaces can be achieved when the two plate filter bodies extend parallel to one another with regard to their plate planes or when the two plate filter bodies extend inclined to one another with regard to their plate planes, wherein in particular provision can be made that at least one of the plate filter bodies is arranged, with regard to its plate plane, inclined to a longitudinal direction of the filter element and/or inclined to a transverse direction of the filter element. Additionally or alternatively, provision can be made that at least one of the plate filter bodies extends parallel to the longitudinal direction of the filter element and/or parallel to the transverse direction of the filter element, with regard to its plate plane.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
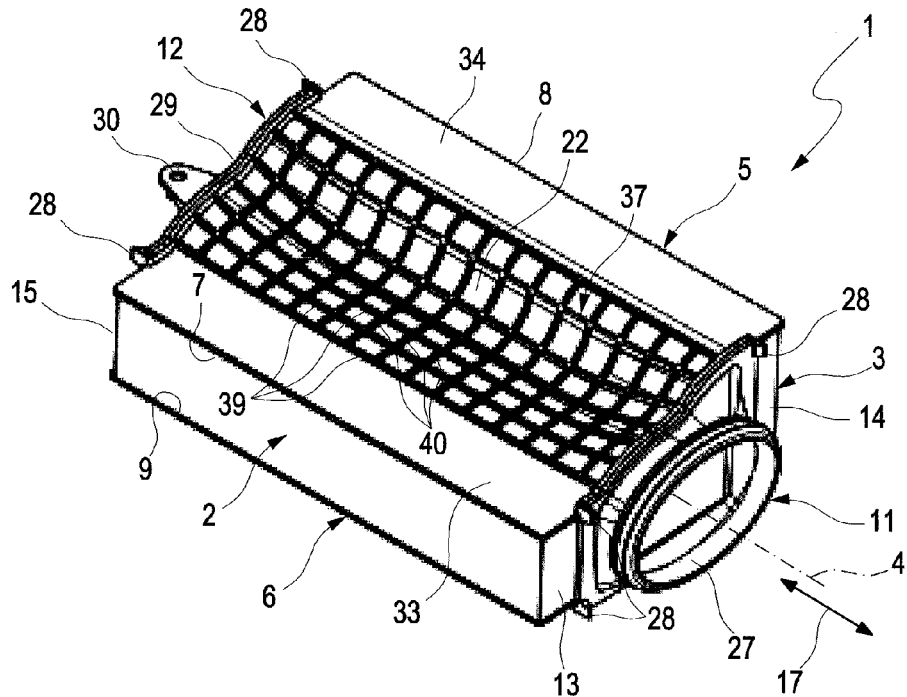
FIGS. 1 and 2 respectively an isometric view of a filter element in opposite viewing directions, FIG. 3 a longitudinal section of the filter element, FIG. 4 a transverse view of the filter element, FIG. 5 a longitudinal view of the filter element, FIGS. 6 to 8 respectively a cross-section of the filter element, but in the case of different embodiments.

According to FIGS. 1 to 5, a filter element 1, which is in particular an air filter element and preferably a vehicle air filter element, comprises a first plate filter body 2 made of a pleated filter material and a second plate filter body 3, likewise made of a pleated filter material. Expediently, the same filter material is concerned. The second plate filter body 3 expediently runs parallel to the first plate filter body 2 and represents a separate component in this respect. The two plate filter bodies 2, 3 lie diametrically opposite one another in the filter element 1 with respect to a longitudinal centre axis 4 of the filter element 1. The respective plate filter body 2, 3 is preferably designed as a flat plate filter body 2, 3, in which a plate plane runs parallel to the folds of the folded filter material and in which the individual folds are arranged adjacent to one another in the plate plane.

The filter element 1 has in addition a first wall body 5 made of a plastic and a second wall body 6 likewise made of a plastic. Expediently, the two wall bodies 5, 6 are injection-moulded from the same plastic. The first wall body 5 is rigidly and tightly connected to a first transverse end 7 of the first plate filter body 2 and to a first transverse end 8 of the second plate filter body 3. The second wall body 6 forms a separate component with respect to the first wall body 5 and is connected rigidly and tightly to a second transverse end 9 of the first plate filter body 2 and to a second transverse end 10 of the second plate filter body 3. Here, the two wall bodies 5, 6 are expediently welded or glued or plasticized to the two plate filter bodies 2, 3. The two wall bodies 5, 6 lie diametrically opposite one another with respect to the longitudinal centre axis 4.

Finally, the filter element 1 additionally comprises a first end body 11 and a second end body 12, respectively made of plastic. The first end body 11 is rigidly and tightly connected to a first longitudinal end 13 of the first plate filter body 2 and to a first longitudinal end 14 of the second plate filter body 3. The second end body 12 is rigidly and tightly connected to a second longitudinal end 15 of the first plate filter body 2 and to a second longitudinal end 16 of the second plate filter body 3. Between the two end bodies 11, 12 and the plate filter bodies 2, 3, adhesive connections are preferred here. The two end bodies 11, 12 lie opposite one another in a longitudinal direction 17 of the filter element 1, which extends parallel to the longitudinal centre axis 4. The two end bodies 11, 12 are, in addition, rigidly and tightly connected to the longitudinal ends, not designated in further detail, of the two wall bodies 5, 6. Here, also, adhesive connections are preferred.

Figure 4:
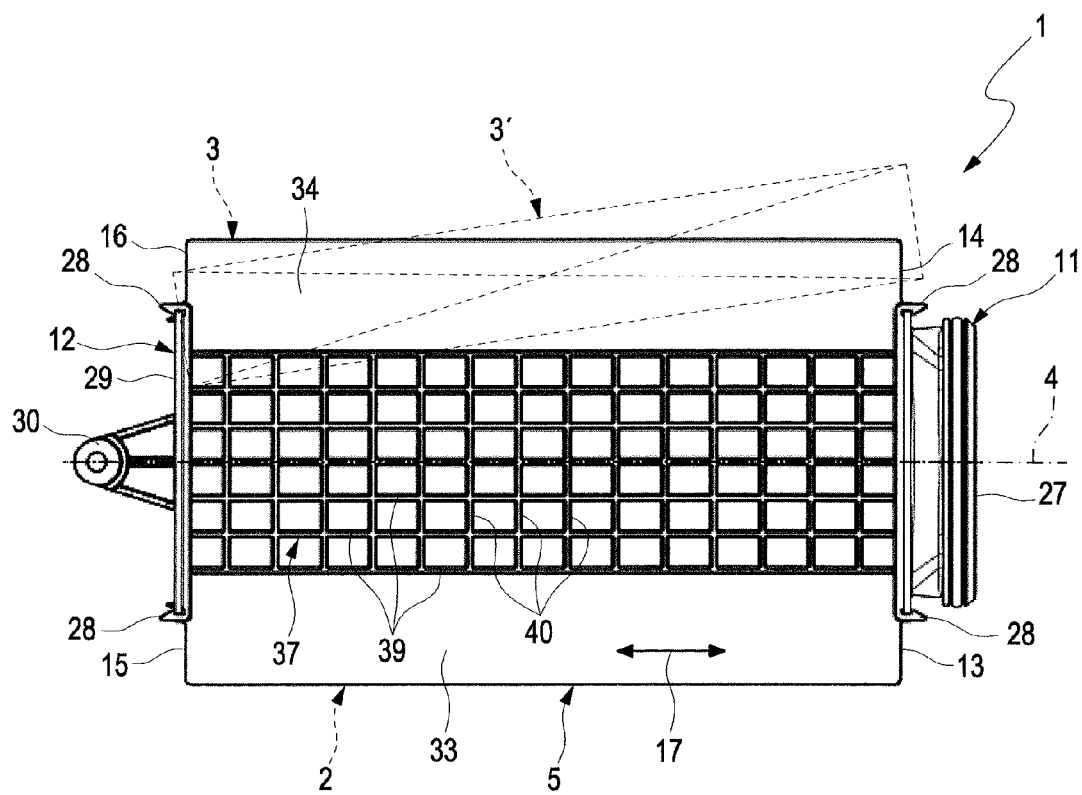
Figure 5:
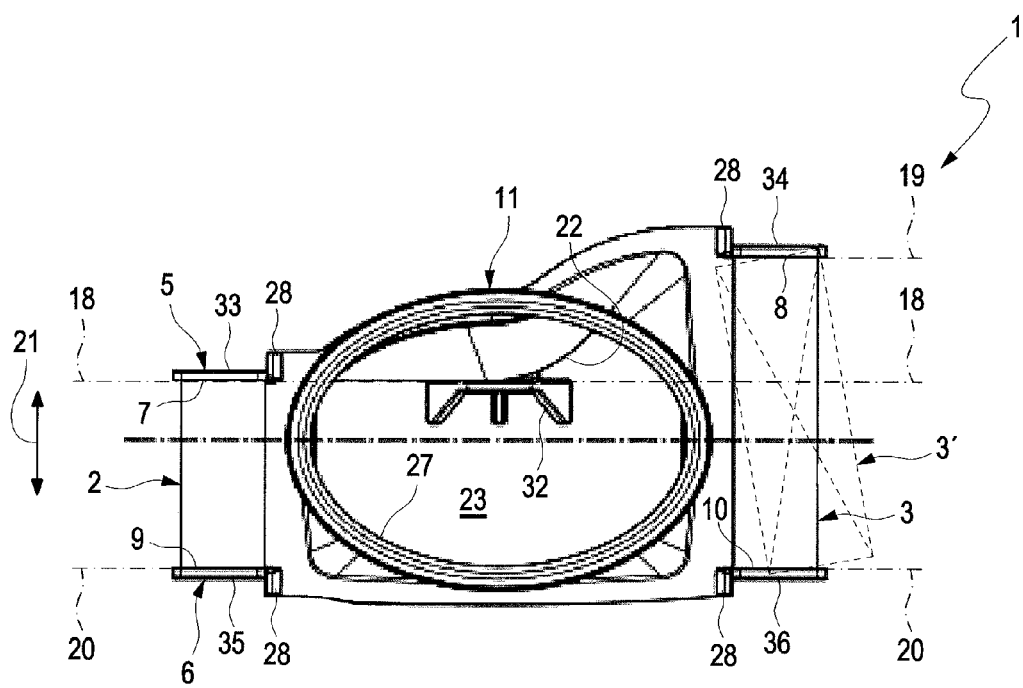

According to FIG. 5, the first transverse end 7 of the first plate filter body 2 lies in a first plane 18, whilst the first transverse end 8 of the second plate filter body 3 lies in a second plane 19, which extends parallel to the first plane 18 and which is spaced apart from the first plane 18. In contrast thereto, the second transverse end 9 of the first plate filter body 2 and the second transverse end 10 of the second plate filter body 3 lie in a shared plane 20. The planes 18, 19, 20 extend here parallel to one another. As can be seen further from FIG. 5, the two plate filter bodies 2, 3 are of different size in a transverse direction 21 of the filter element 1 or respectively of the respective plate filter body 2, 3. In the example of FIGS. 1 to 5, the first plate filter body 2 is dimensioned smaller in the transverse direction 21 than the second plate filter body 3. In contrast thereto, according to FIGS. 1 to 4, the two plate filter bodies 2, 3 are of equal size in their longitudinal direction 17.

Figure 3:
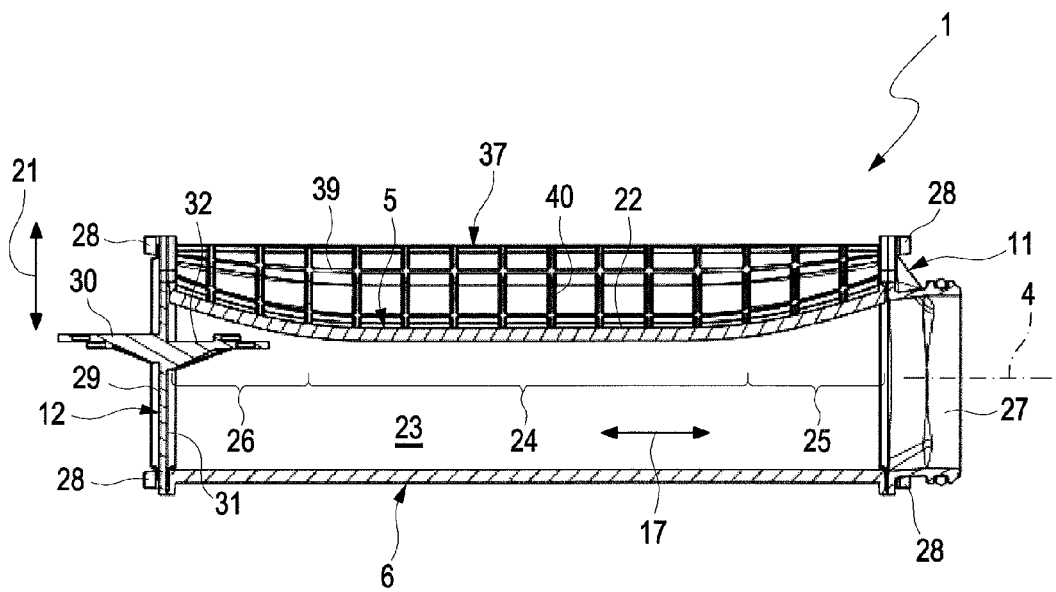

As can be seen in particular from FIGS. 1, 3 and 5, the first wall body 5 in the preferred embodiment shown here can have a curvature 22 between the two plate filter bodies 2, 3 in a profile extending transversely to the longitudinal direction 17. Alternatively to such a curvature 22, a step can also be provided. Whilst such a step is constructed rather in a sharp-edged manner, the curvature 22 has a rounded contour. By means of the curvature 22, the difference in level, which can be seen in FIG. 5, between the two first transverse ends 7, 8 of the two plate filter bodies 2, 3, i.e. the distance between the above-mentioned planes 18, 19, is overcome. In the embodiment which is shown here, the curvature 22 is oriented here into an interior space 23 of the filter element 1, which is configured as a hollow body.

As can be seen in particular from FIG. 3, the curvature 22 is constructed principally in a central region 24 of the first wall body 5, wherein this central region 24 is situated distally to the two end bodies 11, 12. In end regions 25, 26 adjoining onto the central region 24 in the longitudinal direction 17 on both sides, the transition then takes place of the curvature 22 to the geometry of the end bodies 11, 12. In other words, the curvature 22 is more intensively pronounced in the central region 24 than in the end regions 25, 26, via which the connection to the end bodies 11, 12 takes place.

In FIG. 5, the viewing direction of the observer is oriented parallel to the longitudinal direction 17. As can be seen, the curvature 22 projects in the central region 24 laterally into a projection, oriented parallel to the longitudinal direction 17, of a gas passage opening 27, which is constructed in the first end body 11.

The folding of the filter material of the two plate filter bodies 2, 3 takes place expediently in the transverse direction 21. Therefore, the folds extend parallel to the transverse direction 21. End folds of the folded filter material are therefore situated at the longitudinal ends of the respective plate filter body 2, 3 and are rigidly and tightly connected there to the respective end body 11, 12. Accordingly, the first longitudinal ends 13, 14 and the second longitudinal ends 15, 16 of the two plate filter bodies 2, 3 are formed by the end folds of the filter material of the respective plate filter body 2, 3.

The two wall bodies 5, 6 can have at their longitudinal ends respectively two engagement hooks 28. The engagement hooks 28 engage here over the respective end bodies 11, 12 on the edge side. In this way, each end body 11, 12 is secured by a total of four engagement hooks 28 on the two wall bodies 5, 6.

Whilst the first wall body 11 has the gas passage opening 27, which represents either an inlet opening or an outlet opening, the second end body 12 is preferably configured closed. As can be seen in particular from FIG. 3, the second end body 12 can have a first fastening bracket 30 on its outer side 29 facing away from the first end body 11. By means of this first fastening bracket 30, the filter element 1 can be fixed in a filter housing of a filter arrangement. The second end body 12 can have, according to FIG. 3, on its inner side 31 facing the first end body 11, a second fastening bracket 32, on which for example a sensor or suchlike can be fastened.

Figure 2:
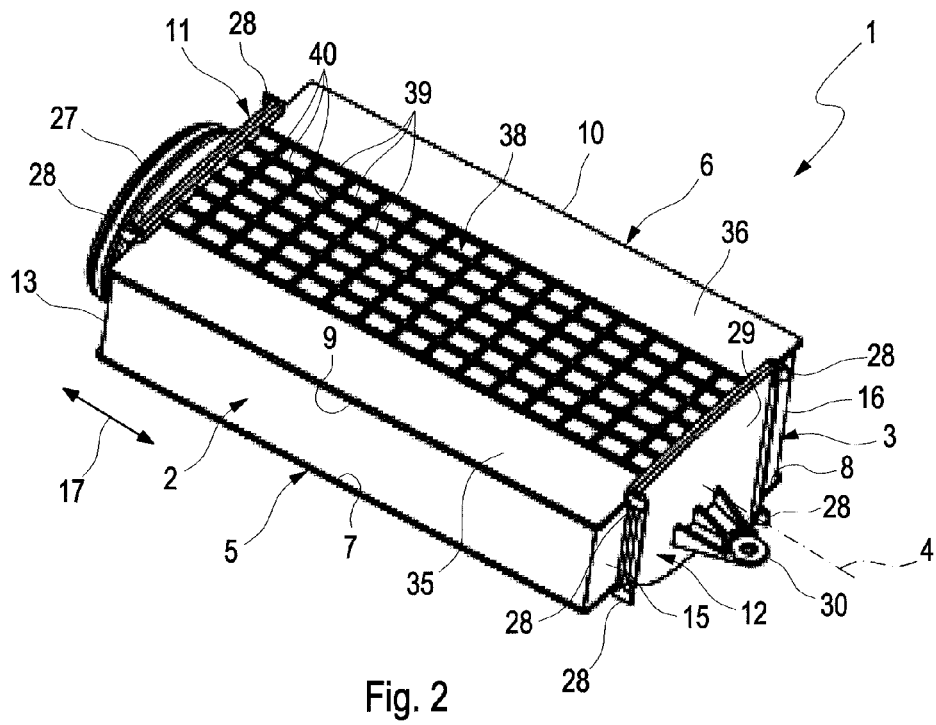

As can be seen from FIGS. 2 and 3, the second wall body 6 is preferably configured to be substantially flat.

The two end bodies 11, 12 are expediently arranged parallel to one another and preferably oriented transversely to the longitudinal centre axis 4. As a whole, according to FIG. 4 therefore a rectangular outer contour is produced for the filter element 1 transversely to the transverse direction 21 standing perpendicularly on the plane of the drawing.

The wall bodies 5, 6 can be ribbed between the border regions 33, 34 of the first wall body 5, connected to the plate filter bodies 2, 3, and border regions 35, 36 of the second wall body 6. The respective ribbing 37 of the first wall body 5 or respectively 38 of the second wall body 6 can comprise here a plurality of longitudinal ribs 39 and a plurality of transverse ribs 40, which intersect one another. In the example of FIGS. 1 to 5, only the outer sides of the two wall bodies 5, 6 facing away from the interior space 23 are ribbed.

Figure 6:
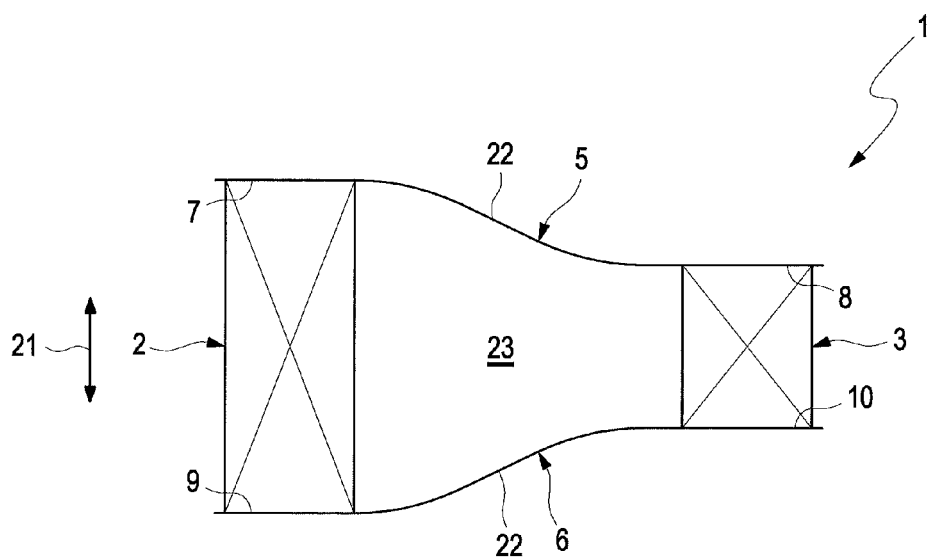

In the embodiment shown in FIG. 6, both wall bodies 5, 6 are equipped respectively with a curvature 22, wherein the two curvatures 22 are oriented uniformly, here respectively inwards.

Figure 7:
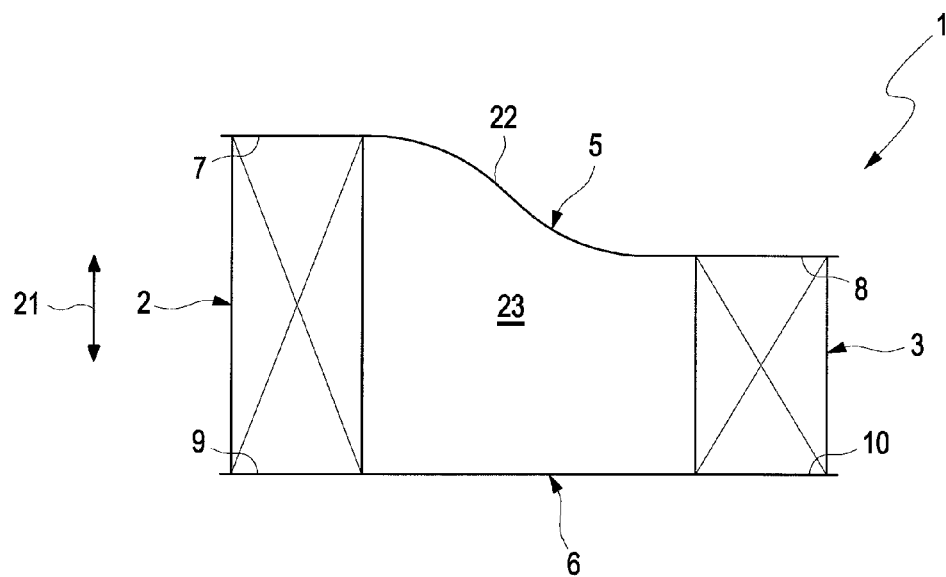

In the embodiment shown in FIG. 7, only the first wall body 5 is equipped with such a curvature 22, which is expediently oriented inwards.

Figure 8:
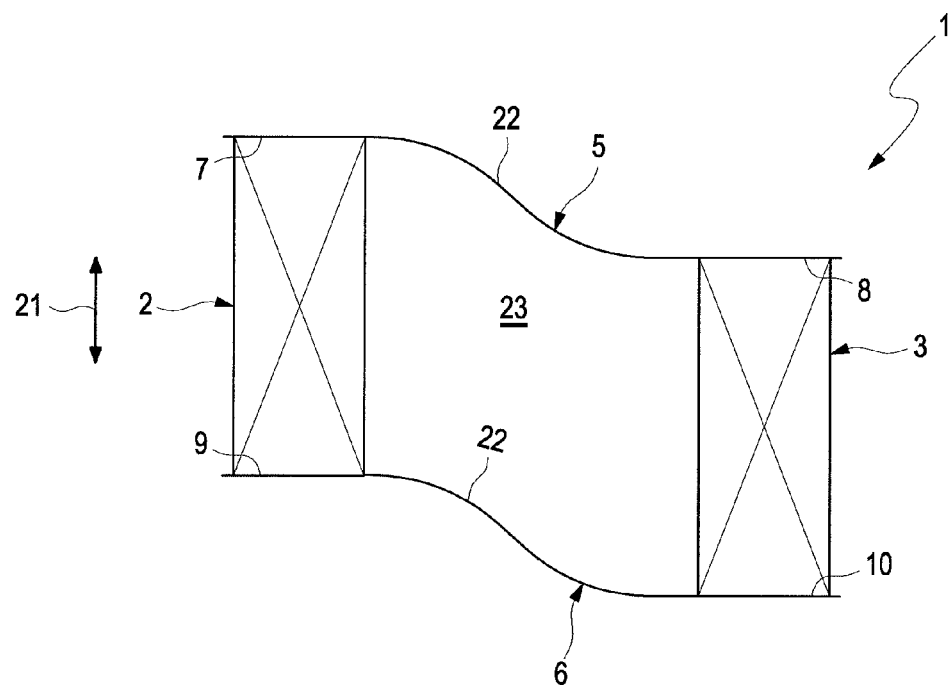

FIG. 8 now shows an embodiment in which again both wall bodies 5, 6 are equipped respectively with such a curvature 22, wherein in this case the two curvatures are oriented differently or respectively in opposition. Whilst the curvature 22 of the first wall body 5 is oriented inwards, the curvature 22 of the second wall body 6 is oriented outwards. In the embodiment shown in FIG. 8, the two plate filter bodies 2, 3 can be dimensioned to be of equal size in the transverse direction 21. In particular, the two plate filter bodies 2, 3 can be identical parts in this embodiment.

In FIG. 4, the two plate filter bodies 2, 3 are concealed by the first wall body 5 and are accordingly indicated by a broken reference line. In FIGS. 4 and 5, two installation variants are indicated purely by way of example for the second plate filter body 3. For the main installation variant, the second plate filter body is designated by 3. For the alternative installation variant, the second plate filter body is designated by 3' and is drawn by a broken line. As can be seen, the two plate filter bodies 2, 3 extend in the main installation variant parallel to one another with respect to their plate planes and parallel to the longitudinal direction 17 and parallel to the transverse direction 21.

In the alternative installation variant, the two plate filter bodies 2, 3 extend inclined to one another with respect to their plate planes. In FIG. 4 here it is indicated for the second plate filter body 3' that it extends inclined to the longitudinal direction 17 of the filter element 1 with regard to its plate plane. In FIG. 5, in contrast, it is indicated that the second plate filter body 3' extends inclined to the transverse direction 21 of the filter element 1 with regard to its plate plane. It is clear that the second plate filter body 3' can also extend inclined to the longitudinal direction 17 and inclined to the transverse direction 21. In the example, the second plate filter bodies 3', inclined with respect to the longitudinal direction 17 and/or to the transverse direction 21, are combined with first plate filter bodies 2, which extend parallel to the longitudinal direction 17 and parallel to the transverse direction 21. Likewise, combinations are conceivable in which both plate filter bodies 2, 3 are inclined with respect to the longitudinal direction 17 and/or to the transverse direction 21, wherein they can then in addition be inclined to one another or can extend parallel to one another.

The invention claimed is:

1. A filter element having a longitudinal center axis for a fresh air system of an internal combustion engine, comprising:
a first plate filter body composed of a pleated filter material;
a separate second plate filter body composed of a pleated filter material disposed opposite the first plate filter body with respect to the longitudinal center axis;
a first wall body composed of a plastic, the first wall body being rigidly and tightly connected to a first transverse end of the first plate filter body and to a first transverse end of the second plate filter body;
a second wall body composed of a plastic and disposed opposite the first wall body with respect to the longitudinal center axis, the second wall body being rigidly and tightly connected to a second transverse end of the first plate filter body and to a second transverse end of the second plate filter body;
a first end body composed of a plastic, the first end body being rigidly and tightly connected to a first longitudinal end of the first plate filter body and to a first longitudinal end of the second plate filter body;
a second end body composed of a plastic and disposed opposite the first end body with respect to the longitudinal center axis, the second end body being rigidly and tightly connected to a second longitudinal end of the first plate filter body and to a second longitudinal end of the second plate filter body;
wherein at least one of the first end body and the second end body has a gas passage opening;
wherein the first plate filter body has a different extent in a transverse direction than the second plate filter body with respect to the longitudinal center axis;
wherein at least one of the first wall body and the second wall body between the first plate filter body and the second plate filter body includes a curvature projecting into an interior space in a profile extending transversely to a longitudinal direction of the longitudinal center axis;
wherein the pleated filter material of the first plate filter body and the second plate filter body is folded in the transverse direction, and an end fold of the pleated filter material of the first plate filter body and the second plate filter body is respectively disposed at the first longitudinal end and the second longitudinal end of the first plate filter body and the second plate filter body and rigidly and tightly connected to the first end body and the second end body; and wherein the curvature transitions the at least one of the first wall body and the second wall body outwardly in the transverse direction from one of the first plate filter body and the second plate filter body towards the other of the first plate filter body and the second plate filter body.

2. The filter element according to claim 1, wherein the first transverse end of the first plate filter body extends in a first plane that is spaced apart in the transverse direction from a second plane, the first transverse end of the second plate filter body extending in the second plane; and wherein the first wall body defines the curvature, the curvature transitioning the first wall body from the first transverse end of the first plate filter body in the first plane to the first transverse end of the second plate filter body in the second plane.

3. The filter element according to claim 1, wherein the first plate filter body and the second plate filter body are of equal extent in the longitudinal direction.

4. The filter element according to claim 1, wherein the curvature of the at least one of the first wall body and the second wall body defines a central region and two end regions in the longitudinal direction, the central region being arranged distally to both the first end body and the second end body with respect to the two end regions, and wherein the curvature in the central region includes a greater deviation from linear than the curvature in the two end regions.

5. The filter element according to claim 1, wherein at least one of the first wall body and the second wall body is fixed in place at a longitudinal end with at least one of the first end body and the second end body.

6. The filter element according to claim 1, wherein the first wall body and the second wall body each include an engagement hook disposed at a longitudinal end, and wherein each engagement hook engages over the first end body or the second end body on the edge side.

7. The filter element according to claim 1, wherein the first end body and the second end body are rigidly and tightly connected to an inner face of the first longitudinal end and the second longitudinal end of the first plate filter body and the second plate filter body and to respective longitudinal ends of the first wall body and the second wall body.

8. The filter element according to claim 1, wherein the first end body includes the gas passage opening and the second end body is closed.

9. The filter element according to claim 8, wherein the second end body includes a fastening bracket for connecting to a filter housing.

10. The filter element according to claim 9, wherein the fastening bracket is disposed on an outer side of the second end body facing away from the first end body, the second end body further including a second fastening bracket on an inner side opposite the fastening bracket facing towards the first end body, and wherein each fastening bracket is configured differently from one another.

11. The filter element according to claim 1, wherein the first plate filter body and the second plate filter body extend parallel to one another along a respective plate plane.

12. The filter element according to claim 1, wherein the first plate filter body and the second plate body each have a plate plane and extend inclined with respect to one another along the respective plate planes.

13. The filter element according to claim 12, wherein at least one of the first plate filter body and the second plate filter body extends with regard to the respective plate planes at least one of parallel to the longitudinal direction and parallel to the transverse direction.

14. The filter element according to claim 12, wherein at least one of the first plate filter body and the second plate filter body extend with regard to the respective plate planes at least one of inclined to the longitudinal direction and inclined to the transverse direction.

15. The filter element according to claim 1, wherein the curvature of the at least one of the first wall body and the second wall body has rounded contour.

16. The filter element according to claim 1, wherein the at least one of the first wall body and the second wall body having the curvature further includes a plurality of ribs disposed on at least one of an interior side and an exterior side of the at least one of the first wall body and the second wall body.

17. The filter element according to claim 1, wherein the curvature is defined on the first wall body, and wherein the second wall body is configured substantially flat.

18. A filter element having a longitudinal center axis for a fresh air system of an internal combustion engine, comprising:

a first plate filter body composed of a pleated filter material, the first plate filter body having a first transverse end disposed opposite a second transverse end in a transverse direction with respect to the longitudinal center axis and a first longitudinal end disposed opposite a second longitudinal end in a longitudinal direction with respect to the longitudinal center axis;

a separate second plate filter body composed of a pleated filter material disposed opposite the first plate filter body in a lateral direction with respect to the longitudinal center axis, the second plate filter body having a first transverse end disposed opposite a second transverse end in the transverse direction with respect to the longitudinal center axis and a first longitudinal end disposed opposite a second longitudinal end in the longitudinal direction with respect to the longitudinal center axis;

a first wall body rigidly and tightly connected to the first transverse end of the first plate filter body and the first transverse end of the second plate filter body;

a second wall body disposed opposite the first wall body in the transverse direction with respect to the longitudinal center axis, the second wall body being rigidly and tightly connected to the second transverse end of the first plate filter body and the second transverse end of the second plate filter body;

a first end body rigidly and tightly connected to the first longitudinal end of the first plate filter body and the first longitudinal end of the second plate filter body;

a second end body disposed opposite the first end body in the longitudinal direction with respect to the longitudinal center axis, the second end body being rigidly and tightly connected to the second longitudinal end of the first plate filter body and the second longitudinal end of the second plate filter body;

wherein at least one of the first end body and the second end body includes a gas passage opening;

wherein the first plate filter body has a different extent in the transverse direction than the second plate filter body with respect to the longitudinal center axis;

wherein at least one of the first wall body and the second wall body between the first plate filter body and the second plate filter body includes a curvature projecting into an interior space in a profile extending transversely to the longitudinal direction of the first plate filter body and the second plate filter body; and wherein the pleated filter material of at least one of the first plate filter body and the second plate filter body is folded in the transverse direction to provide folds extending parallel to the transverse direction, and wherein end folds of the pleated filter material of the first plate filter body and the second plate filter body are disposed at the first longitudinal end and the second longitudinal end of the first plate filter body and the second plate filter body and are rigidly and tightly connected to the first end body and the second end body.

19. A filter element having a longitudinal center axis for a fresh air system of an internal combustion engine, comprising:
- a first plate filter body composed of a pleated filter material, the first plate filter body having a first transverse end disposed opposite a second transverse end in a transverse direction of the longitudinal center axis and a first longitudinal end disposed opposite a second longitudinal end in a longitudinal direction of the longitudinal center axis;
- a separate second plate filter body composed of a pleated filter material disposed opposite the first plate filter body in a lateral direction of the longitudinal center axis, the second plate filter body having a first transverse end disposed opposite a second transverse end in the transverse direction and a first longitudinal end disposed opposite a second longitudinal end in the longitudinal direction;
- a first wall body rigidly and tightly connected to the first transverse end of the first plate filter body and the first transverse end of the second plate filter body;
- a second wall body disposed opposite the first wall body in the transverse direction of the longitudinal center axis, the second wall body being rigidly and tightly connected to the second transverse end of the first plate filter body and the second transverse end of the second plate filter body;
- a first end body rigidly and tightly connected to the first longitudinal end of the first plate filter body and the first longitudinal end of the second plate filter body;
- a second end body disposed opposite the first end body in the longitudinal direction of the longitudinal center axis, the second end body being rigidly and tightly connected to the second longitudinal end of the first plate filter body and the second longitudinal end of the second plate filter body;
- a gas passage opening disposed in at least one of the first end body and the second end body;
- the first plate filter body defining a transverse extent in the transverse direction different from that of the second plate filter body, wherein the first transverse end of the first plate filter body lies in a first plane and the first transverse end of the second plate filter body lies in a second plane, the first plane offset in the transverse direction from the second plane;
- wherein the first wall body has a curvature between the first plate filter body and the second plate filter body in a profile extending transversely to the longitudinal direction, and wherein the curvature transitions the first wall body in the transverse direction from the first transverse end of the first plate filter body lying in the first plane to the first transverse end of the second plate filter body lying in the second plane such that the first wall body in a first region connected to the first transverse end of one of the first plate filter body and the second plate filter body is elevated in the transverse direction with respect to a second region of the first wall body connected the first transverse end of the other of the first plate filter body and the second plate filter body.

20. The filter element according to claim 19, wherein the second transverse end of the first plate filter body and the second transverse end of the second plate filter body lie in a shared plane.

* * * * *